March 23, 1943.　　　R. C. DICKINSON　　　2,314,693
ELECTRIC CIRCUIT INTERRUPTER
Filed Sept. 9, 1939　　　2 Sheets-Sheet 2
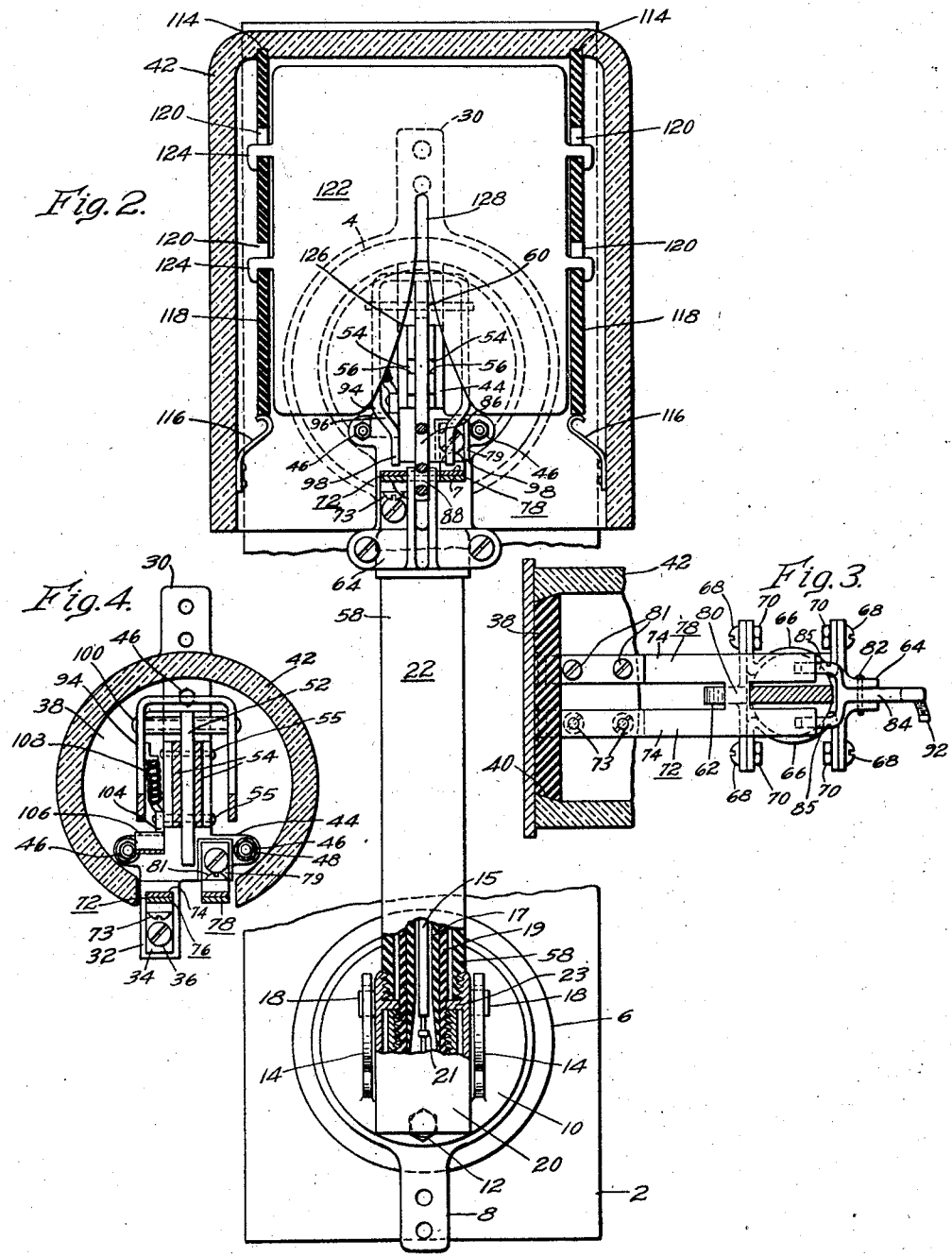
WITNESSES:
C. J. Weller.
A. T. Stratton
INVENTOR
Robert C. Dickinson.
BY
Ralph H. Swingle
ATTORNEY Patented Mar. 23, 1943

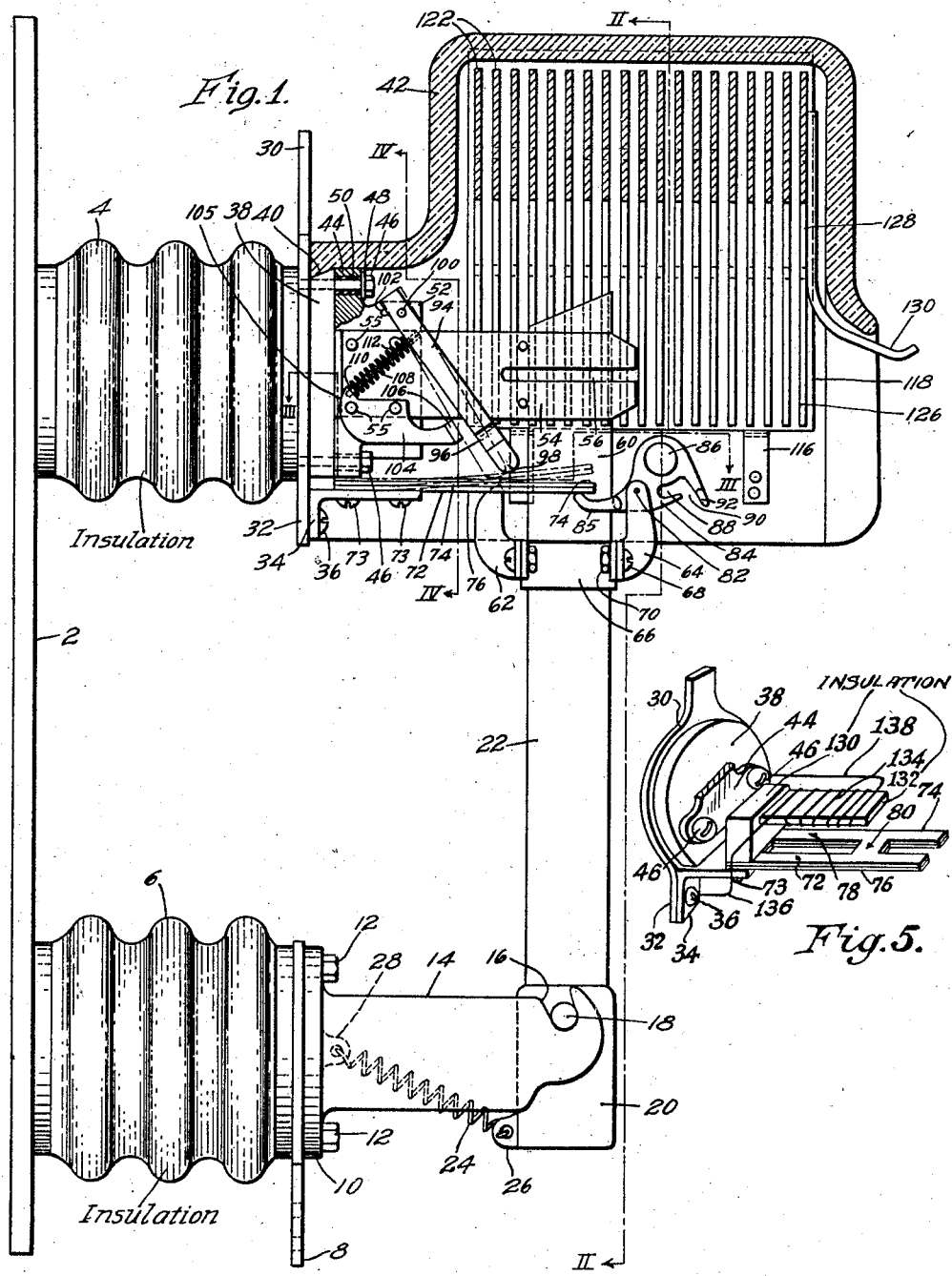

2,314,693

UNITED STATES PATENT OFFICE 2,314,693

ELECTRIC CIRCUIT INTERRUPTER

Robert C. Dickinson, Wilkinsburg, Pa., assignor to Westinghouse Electric & Manufacturing Company, East Pittsburgh, Pa., a corporation of Pennsylvania Application September 9, 1939, Serial No. 294,069

41 Claims. (Cl. 200—114)

This invention relates generally to high voltage fuses, and more particularly to fuses of this type adapted to interrupt normal load currents and overload currents, as well as short circuit currents existing in an associated circuit.

For the proper protection and servicing of high voltage electric transmission circuits, it is necessary to provide means for interrupting the circuit, both manually and automatically, under diverse load conditions which may exist in the circuit, and at least some of the circuit interruptions should take place automatically in response to a particular load on the circuit. For example, it is necessary to provide a means which will operate to automatically open a circuit in response to a short circuit, and a means which will operate automatically to open a circuit upon the occurrence of a predetermined overload in the circuit to protect the circuit and apparatus served thereby from damage. Also a manually controllable means for opening a circuit under normal load or no load conditions is necessary for switching and testing purposes.

Heretofore, it has been the practice to install two or more separate pieces of apparatus in a circuit for protecting and servicing a circuit in the manner mentioned above. Thus it has been customary to provide a circuit with a fuse to interrupt short circuit currents, a circuit breaker automatically responsive to a predetermined overload to open the circuit, and a disconnecting switch manually controllable for interrupting the circuit under no-load or light-load conditions.

It is an object of my invention to incorporate in a single structure means to give automatic protection against short circuits and predetermined overloads, and which will also serve as a manually controllable disconnecting or switching device for interrupting a circuit under normal or no-load conditions. Such a structure will obviously give proper protection and service for high voltage circuits and at the same time eliminate one or more pieces of apparatus used heretofore to attain a like result.

It is a further object of my invention to provide a high voltage fuse having novel means to maintain the same in a circuit upon the occurrence of a short circuit, and which will operate to remove the fuse from the circuit after the fuse has blown.

Another object of my invention is to provide novel means to interrupt a circuit in response to the occurrence of a predetermined overload in the circuit.

Another object of my invention is to provide a high voltage fuse having at least one terminal which is separable from its associated fixed contact, and having arc extinguishing means at said terminal so that the fuse may be used as a circuit interrupter for load currents.

Another object of my invention is to provide a high voltage fuse, which is movable to interrupt a circuit, with a means to lock it in the circuit and means to remove it from the circuit, a further means to release the locking means upon the occurrence of a predetermined overload in the circuit, and another means to block out the lock-release means upon the occurrence of a short circuit to insure circuit interruption under the latter condition by blowing of the fuse.

These and other objects of my invention will become more apparent upon consideration of the following specification of a preferred form of my invention which is illustrated in the attached drawings in which:

Figure 1 is a side view, partly in section, of a circuit interrupter embodying my invention;

Fig. 2 is a front view, partly in section, taken on the line II—II of Fig. 1;

Fig. 3 is a horizontal sectional view taken on the line III—III of Fig. 1;

Fig. 4 is a sectional view taken on the line IV—IV of Fig. 1; and

Fig. 5 is a partial perspective view showing a modified construction.

In the embodiment of my invention illustrated, I have shown a stationary support 2 carrying the vertically spaced insulators 4 and 6 which may be of any suitable insulating material such, for example, as porcelain or the like. The lower insulator 6 carries at its outer end a terminal part 8 of suitable conducting material such as copper. On the outer face of the terminal portion 8 there is secured the base 10 of a fixed contact member embodying the spaced sides 14. The fixed contact member 14 and the terminal portion 8 are secured to the insulator 6 in any suitable manner, such for example, as by bolts 12 as shown. The spaced fixed contact sides 14 are provided at their outer ends with upwardly opening slots 16 for the reception of pins 18 provided on opposite sides of the lower terminal 20 of a fuse 22. A spring 24 is connected at one end to an ear 26 provided on the fixed contact base 10 between the contact sides 14, and at its other end the spring is secured to an ear 28 provided on the lower fuse terminal. The spring is arranged so that when the fuse is in the vertical position as shown in Fig. 1, the spring 24 will be under tension and consequently will tend to move the fuse 22 in a clockwise direction about the pins 18 as a hinge.

The upper insulator 4 is provided on its outer end with a terminal portion 30 of suitable conducting material like the terminal portion 8. On the outer face of the terminal 30 there is provided an insulating base block 38. Ahead of the block 38 is positioned a fixed contact support 44. Bolts 46 pass through the fixed contact support 44, the insulating base 38, the terminal part 30 and threadedly engage in the insulator 4 to maintain these parts in assembled relation. The insulating base 38 is provided with an outwardly inclined edge portion 40 which receives a complementary inclined edge provided on the insulating housing 42 when the parts are assembled with respect to the upper insulator 4. The insulating base 38 and housing 42 may be formed of any suitable insulating material, such, for example, as porcelain. The bolts 46 pass through insulating sleeves 50 of rubber, fibre or other insulating material and are provided with washers 48 of rubber, fibre or other insulating material to insulate the same from the fixed contact support 44.

The stationary contact is mounted on a forwardly projecting portion 52 of the support 44 and embodies the sides 54 secured on opposite sides of the support 52 by any suitable means such as the rivets 55, and are provided at their outer ends with inwardly extending slots 56. The fuse 22 is provided with an insulating tube 58 and an upper knife blade contact 60 for engagement between the sides 54 of the stationary contact. On the fuse tube 58 which is of insulating material, such, for example, as porcelain or fibre, there is provided adjacent its upper end a hook member 62 and a bracket 64, both of which are secured to the fuse tube 58 by arcuate supporting members 66 at opposite sides of the fuse tube, the ends of members 66 are securely bolted to the catch 62 and bracket 64, respectively, as by the bolts 68 and nuts 70. The fuse tube and fuse construction may be of any desired construction embodying a fusible element, however, the preferred fuse is that disclosed in the patent to H. L. Rawlins, No. 1,976,634, granted October 9, 1934.

This fuse construction, as shown in Fig. 2, embodies a refill element which is removably secured in the outer fuse tube 58, the refill element includes a fusible member 21 suitably secured to the fuse terminal portion 20 at one end thereof and secured at its other end to an arc drawing member 15 located in a bore in the refill insulating tube 19 which is formed of fibre or other desired insulating material, the insulating tube 19 has its bore lined with a material capable of evolving an arc extinguishing gas when in proximity to an electric arc, such as compressed boric acid. The refill element is secured in the outer fuse tube against the inwardly extending shoulder 23 integral with the fuse terminal 20. As explained in the Rawlins Patent No. 1,976,634, upon passage of a predetermined current through the fuse, the fusible element 21 is melted to release the arc drawing member 15 which is moved upwardly through the refill bore past the gas evolving material 17 to draw out and extinguish the resulting arc.

The terminal portion 30 is provided with a downwardly extending part 32 adapted to support a bracket 34 which is secured thereto by any suitable means, such as by a machine screw 36, and the bracket 34 includes a forwardly extending portion for supporting one leg 72 of a bimetallic latch, for example, as by the screws 73. The bimetallic latch is generally of H-shape and includes a second leg 78 secured to a bracket 79 as by the screws 81, and the bracket 79 is, in turn, carried by the fixed contact support 44. The cross bar 80 of the latch is positioned to be engaged by the hook 62 on the fuse in the closed position of the same. The portions of the legs 72 and 78 of the latch which extend forwardly of the cross piece 80 are positioned at opposite sides of the knife blade fuse contact to be engageable by a manually operable release means to be hereinafter described. These forwardly projecting portions of the latch may be made of insulating or other material if desired, since they are not included in the electric circuit through the latch.

Pivoted on the bracket 64 as at 82 is a lever 84 provided with rearwardly extending spaced arms 85 for engagement beneath the bimetal latch, and a forwardly extending portion having an aperture 86 for the reception of a hook stick operating member or the like, and an aperture 88 opening downwardly at 90 and provided with a downwardly extending portion 92 for guiding an operating implement into the aperture 88 for lifting the fuse from its mounting after being moved to open position.

In the structure thus far described the electric circuit may be traced from the upper terminal part 30 through bracket 34 and leg 72 of the bimetal latch through the cross piece 80 and leg 78 of the latch to bracket 79, stationary contact support 44, stationary contact sides 54, fuse contact 60 through the fuse to the lower stationary contact 14 and lower terminal 8. It is therefore apparent that the bimetal latch is in series in the circuit through my device. Therefore, upon the occurrence of a predetermined overload in the circuit associated therewith, the bimetallic latch will be raised to the dotted line position shown in Fig. 1, so as to clear the hook 62, whereupon the spring 24 is free to rotate the fuse 22 in the clockwise direction and remove it from the circuit. Also, when desired, the circuit may be interrupted under lesser load condition or no-load conditions by inserting an operating implement in the apertures 86 or 88 of the lever 84 and by exerting a downward pull on the same, the lever will be rotated in a clockwise direction and the inner arms 85 thereof will be moved upwardly, thereby moving the bimetal latch upwardly out of engagement with the catch 62, again allowing spring 24 to remove the fuse from the circuit.

The bimetal latch is composed of two laminations 74 and 76 of any well known resistance material intimately bonded together, as by welding, the upper lamination 74 being of a material having a lesser coefficient of expansion than that of the lower lamination. Any desired materials may be employed for the laminations. For example, the one of least coefficient of expansion could be a nickel-steel whereas the lower lamination could be of brass or bronze.

Instead of having a self-heated bimetallic element, applicant may provide a separate heater for the bimetal so that the bimetal may be independent of the electric circuit through the interrupter. Such a structure is illustrated more or less diagrammatically in Fig. 5 of the drawings wherein an insulating block 130 is secured to supporting bracket 34 by screws 73. This insulating block has a flat supporting member 132, also of insulating material, projecting from the upper end thereof in substantially parallel relation with the bimetal but spaced therefrom. Coiled about the insulating plate 132 is a resistance wire 134 which may be of any desired resistance material, one end of which, 136, is secured to the downwardly extending part 32 of terminal plate 30, and the other end of which, 138, is secured to stationary contact support 44 by one of the screws 46.

Obviously, in the embodiment of my invention shown in Fig. 5, the circuit through the interrupter instead of extending through the bimetal element by-passes this element and extends from terminal plate 30 through the resistance conductor 134 coiled about insulating plate 132, its stationary contact support 44, and from there through fuse 22 in the same manner previously described.

A substantially U-shaped lock member 94 embraces the fixed contact and is pivotally mounted adjacent its upper closed end on a pin 100 extending through the forwardly projecting portion 52 of the fixed contact support 44. The lock member 94 is composed of any desired magnetic material such, for example, as soft iron. The free ends of the lock 94 are offset inwardly towards each other at 96 and terminate in spaced parallel end portions 98. A stop 102 is provided on the fixed contact support in back of, and above, the lock pivot 100. This stop portion limits movement of the lock in a counter-clockwise direction. Mounted on one side of the supporting portion 52 is an armature support 104 secured thereto by any suitable means such, for example, as the rivets 55. This armature support has a forwardly projecting portion terminating in an armature 106 positioned to limit movement of the lock 94 in the clockwise direction, as viewed in Fig. 1. The armature 106 is also of a magnetic material such, for example, as soft iron. A coil spring 108 is maintained in compression between an intermediate portion of lock 94 and an abutment 105 provided on the armature support 104 by having the end coils thereof telescoping over pins 110 and 112 provided on the abutment and locking member, respectively. Thus it can be seen that the spring 108 continually urges the lock 94 in a counter-clockwise direction about its pivot 100 to a position where its upper end engages the stop 102.

The lock 94, it should be noted, substantially surrounds the fixed contact sides 54 and is so proportioned that when an abnormally heavy overload or short circuit current passes through the fixed contact, the lock 94 will become sufficiently magnetized as to be attracted to the armature 106, overcoming the resistance of spring 108, as shown by the dash line in Fig. 1. In this position the lock will prevent the bimetal latch from raising clear of the hook 62 thereby retaining the fuse in the circuit and ensuring interruption of the circuit under such overloads by the fuse element. Should manual operation be attempted upon the occurrence of an abnormally heavy overload before the fuse 22 has blown, the force exerted by the lock 94 on the bimetal latch, will indicate to the operator that manual operation should not be attempted, and if the overload is great enough, manual operation may be prevented. Ordinarily, however, the fuse 22 will blow upon the occurrence of such overloads. Upon passage through the fixed contact of lighter overload or normal overload currents, the lock 94 does not become sufficiently magnetized to overcome the resistance of spring 108. The resistance of the spring 108 and the air gap between the lock 94 and its armature 106 is proportioned so that the lock 94 will be sufficiently magnetized to be attracted into engagement with the armature 106 only upon the passage through the fixed contact of abnormally heavy overload or short circuit currents.

The insulating housing 42 is provided with an enlarged portion substantially surrounding the entire upper end of the fuse and the upper contacts. As shown in Fig. 2, the outer portion of the housing is of substantially inverted U-shape and is provided in its upper wall with longitudinal slots 114 located adjacent opposite sides of the housing for the reception of the upper edges of insulating plates 118, which plates may be made of any suitable insulating material preferably of fibre or the like. The plates 118 are maintained in the slots 114 by inwardly extending brackets 116 provided on the inner walls of the housing adjacent the lower portion thereof. The plates 118 have aligned vertically and horizontally spaced apertures 120 to receive hooks 124 provided on the opposite sides of the spaced plates 122. The apertures 120 are made large enough so that the entire hook portion 124 may pass therethrough to facilitate the assembling of the housing structure. The plates 122 are preferably made of any suitable magnetic material such, for example, as soft iron, and each plate is provided with a central downwardly opening slot 128 having a flaring mouth 126. Each plate 122 is identical in structure and there may be provided as many as may be desired, nineteen plates being shown. The forwardmost plate is provided with a downwardly and outwardly extending projection 130 of the same material as the plate which extends adjacent to and parallel with the path followed by the knife blade contact of the fuse in its opening movement.

The purpose of the plate and housing structure is to extinguish the arc formed when the circuit is interrupted at the fuse blade contact 60 and fixed contact 54. When these contacts separate and an arc is formed, the current passing through the arc will magnetize the plates 122, and the resulting field will draw the arc upwardly into the narrow portion of the slot 128. This constriction of the arc will increase the voltage drop through the arc, and if this reaches a value greater than line voltage, the arc will be extinguished before it reaches the end of the slot. The arc may travel upwardly beyond the end of the slot in the plates 122 and be broken up into a plurality of individual arcs between plates, thus helping to build up the voltage drop through the arc and cause its extinction. The projecting portion 130 on the outermost plate will take the arcing from the moving contact 60 of the blade to the outermost plate 122.

It is therefore, apparent that I have provided a circuit interrupting device which consists of a fuse capable of being manually disconnected from the circuit and which is provided with a latch to maintain it in the circuit, which latch is responsive to predetermined normal overload conditions to automatically release and allow the fuse to drop out of the circuit. It should also be apparent that I have provided a lock for the latch which is responsive to abnormal overloads or short circuits to engage the latch and prevent it from releasing upon the occurrence of such load conditions to ensure opening of the circuit under these conditions by the fuse 22. After the fuse 22 has operated to open the circuit within the fuse, then, of course, the latch lock 94 is demagnetized and the spring 108 returns it to the full line position shown in Fig. 1, allowing the bimetal latch which has become heated due to the passage of the overload currents therethrough to pass to the dotted-line position shown in Fig. 1 to release the catch 62 and permit the spring 24 to remove the fuse from the circuit. Thus, in another aspect of my invention it is seen that I have provided a fuse which, upon the occurrence of a short-circuit or abnormally heavy overloads, is positively locked in the circuit, thereby ensuring circuit interruption within the fuse, and after such interruption has taken place, the lock is released and the fuse is then removed from the circuit. According to this aspect of my invention, I have provided a drop-out fuse which cannot drop out of a circuit until after the overload has been interrupted within the fuse. Consequently there can be no arcing at the fuse terminal.

I have also provided a circuit interrupting device which includes a pair of circuit interrupting means of different capacities electrically connected in series, both means include provisions for extinguishing arcs, and both interrupting means are adapted to be mounted as a single unit on a support. The low capacity interrupting means is both manually and automatically operable, and gives protection against moderate overloads and requires only a simple closing operation to reclose the circuit after an interruption. The high capacity interrupting means gives automatic protection against short circuits and abnormally heavy overloads, locking out the low capacity interrupting means upon the occurrence of such overloads.

Although I have shown and described, in detail, one embodiment of my invention, I do not wish to be limited thereto, as it will be obvious to persons skilled in the art that many modifications and changes may be made therein within the scope of my invention. Therefore, I desire that my invention be interpreted as broadly as possible, and that it be limited solely by the prior art and by what is expressly stated in the appended claims.

I claim as my invention:

1. In a circuit interrupting device, interrupting means having a pair of terminals, said interrupting means opening the circuit upon the passage therethrough of currents of a predetermined magnitude, a contact adapted to be engaged by one of said terminals, means for releasably maintaining said one terminal in engagement with said contact, and current-responsive locking means operable to prevent release of said second-mentioned means until after said interrupting means has operated to open the circuit.

2. In a circuit interrupting device, interrupting means having a pair of terminals, said interrupting means opening the circuit upon the passage therethrough of currents of a predetermined magnitude, a contact adapted to be engaged by one of said terminals, means for releasably maintaining said one terminal in engagement with said contact, and means responsive to said currents of predetermined magnitude operable to prevent release of said second-mentioned means until after said interrupting means has operated to open the circuit.

3. In a circuit interrupting device, interrupting means including a pair of terminals adjacent its opposite ends, a fusible element connected between the terminals, a pair of contacts, said means being movably mounted at one end thereof with the terminal at said one end engaging one contact, the other terminal being movable into and out of engagement with the other contact, and current responsive means for locking said interrupting means in engagement with said contacts upon the passage therethrough of a current sufficient to fuse said fusible element.

4. In a circuit interrupting device, interrupting means including a pair of terminals adjacent its opposite ends, a fusible element connected between the terminals, a pair of contacts, said means being movably mounted at one end thereof with the terminal at said one end engaging one contact, the other terminal being movable into and out of engagement with the other contact, and current responsive means for locking said interrupting means in engagement with said contacts upon the passage therethrough of a current sufficient to fuse said fusible element, and means to thereafter remove said interrupting means and fusible element from the circuit.

5. In a circuit interrupting device, interrupting means having a pair of terminals, said interrupting means opening the circuit upon the passage therethrough of currents of a predetermined magnitude, a contact adapted to be engaged by one of said terminals, means for releasably maintaining said one terminal in engagement with said contact, means responsive to said currents of predetermined magnitude operable to prevent release of said second-mentioned means until after said circuit interrupting means has operated to open the circuit, and manually operable means for releasing said second-mentioned means.

6. In a circuit interrupting device, interrupting means having a pair of terminals, said interrupting means opening the circuit upon the passage therethrough of currents of a predetermined magnitude, a contact adapted to be engaged by one of said terminals, means for releasably maintaining said one terminal in engagement with said contact, current-responsive means operable to prevent release of said second-mentioned means until after the circuit interrupting means has operated to open the circuit, and resilient means constantly urging said interrupting means to a circuit interrupting position.

7. In a circuit interrupting device, a support, interrupting means thereon including a pair of terminals adjacent its opposite ends, a fusible element connected between the terminals, a pair of contacts, said support being movably mounted at one end thereof with the terminal at said one end engaging one contact, the other terminal being movable into and out of engagement with the other contact, current responsive means for locking said support in engagement with said contacts upon the passage therethrough of a current sufficient to fuse said fusible element, manually operable means to move said support for interrupting the circuit at said movable terminal, and arc-extinguishing means about said movable terminal and its associated contact.

8. In a circuit interrupting device, interrupting means including a support having a pair of terminals, said interrupting means opening the circuit upon the passage therethrough of currents of a predetermined magnitude, a contact adapted to be engaged by one of said terminals, a bimetal latch in series in the circuit and engaging said support to maintain said one support terminal in engagement with said contact, said latch acting to release said interrupting means upon passage of a current of a lesser predetermined magnitude through the device, stressed resilient means to remove the interrupting means from said contact when the latch releases, and magnetic means positioned to be sufficiently magnetized by passage of a current of said first predetermined magnitude through the device to prevent release of said latch until after the circuit has been interrupted by the circuit interrupting means on the support.

9. In a circuit interrupting device, interrupting means having a pair of terminals and adapted to interrupt the circuit upon the passage therethrough of currents greater than a predetermined value, a contact adapted to be engaged by one of said terminals, current responsive means releasably maintaining said one terminal in engagement with said contact and adapted to release the same upon the passage therethrough of a current of a value less than said predetermined value, and additional means responsive to currents of said first-mentioned value to prevent release of said second-mentioned means, whereby currents of a certain value will be interrupted at said contact, and currents of a greater magnitude will be interrupted by said interrupting means.

10. In a high voltage circuit interrupting device, interrupting means having a pair of terminals adapted to interrupt the circuit upon the passage therethrough of currents greater than a predetermined value, a contact adapted to be engaged by one of said terminals, current responsive means releasably maintaining said one terminal in engagement with said contact and adapted to release the same upon the passage therethrough of a current of a predetermined lesser value, and additional means responsive to currents of said first-mentioned value to prevent release of said second-mentioned means, means constantly urging said interrupting means to a circuit interrupting position, whereby currents of a certain value will be interrupted at said contacts, and currents of a greater magnitude will be interrupted by said interrupting means.

11. In a high voltage circuit interrupting device, interrupting means having a pair of terminals adapted to interrupt the circuit upon the passage therethrough of currents greater than a predetermined value, a contact adapted to be engaged by one of said terminals, current responsive means releasably maintaining said one terminal in engagement with said contact and adapted to release the same upon the passage therethrough of a current of a predetermined lesser value, additional means responsive to currents of said first-mentioned value to prevent release of said second-mentioned means, manually operable means to release said second-mentioned means, whereby currents up to a predetermined magnitude may be interrupted at said contacts, and currents of a greater magnitude must be interrupted by the circuit interrupting means on the support.

12. In a high voltage circuit interrupting device, interrupting means having a pair of terminals and capable of interrupting the circuit upon the passage therethrough of currents greater than a predetermined value, a contact adapted to be engaged by one of said terminals, current responsive means releasably maintaining said one terminal in engagement with said contact and adapted to release the same upon the passage therethrough of currents above a predetermined lesser value, additional means responsive to currents of said first-mentioned value to prevent release of said second-mentioned means, and arc-extinguishing means capable of extinguishing arcs, the currents of which are below said first predetermined value for extinguishing the arc formed when the circuit is interrupted at said contact.

13. In a circuit interrupting device, a fuse pivotally mounted adjacent one end for movement into and out of engagement with a contact adjacent the other end thereof, current responsive latch means for maintaining the fuse in engagement with the said contact, said latch means being responsive to overload currents of a predetermined magnitude to release the fuse, and means responsive to currents of greater predetermined magnitude to prevent release of said latch means to ensure interruption of said greater currents by said fuse.

14. In a circuit interrupting device, a fuse pivotally mounted adjacent one end for movement into and out of engagement with a contact adjacent the other end thereof, resilient means biasing said fuse in a direction away from said contact, current responsive latch means for maintaining the fuse in engagement with said contact, said latch means being responsive to overload currents of a predetermined magnitude to release the fuse, and means responsive to currents of greater predetermined magnitude to prevent release of said latch means to positively ensure interruption of said greater currents by said fuse.

15. In a circuit interrupting device, a fuse pivotally mounted adjacent one end for movement into and out of engagement with a contact adjacent the other end thereof, current responsive latch means for maintaining the fuse in engagement with said contact, said latch means being responsive to overload currents of a predetermined magnitude to release the fuse, means responsive to currents of greater predetermined magnitude to prevent release of said latch means to ensure interruption of said greater currents by said fuse, and manually operable means to release said latch and move the fuse to circuit interrupting position.

16. In a circuit interrupting device, a fuse pivotally mounted adjacent one end for movement into and out of engagement with a contact adjacent the other end thereof, current responsive latch means for maintaining the fuse in engagement with said contact, said latch means being responsive to overload currents of a predetermined magnitude to release the fuse, means responsive to currents of greater predetermined magnitude to prevent release of said latch means to ensure interruption of said greater currents by said fuse, and arc-extinguishing means for extinguishing the arc formed when the circuit is interrupted under load at said contact.

17. In a circuit interrupting device, a movable contact, a contact engageable thereby, current responsive latch means maintaining said contacts in engagement and operable to release said movable contact upon passage therethrough of currents of a predetermined magnitude, and further current responsive means preventing release of said latch means upon the passage through the device of currents of a greater predetermined magnitude.

18. In a circuit interrupting device, a movable contact, a contact engageable thereby, bimetal latch means maintaining said contacts in engagement and operable to release said movable contact upon the passage therethrough of a current of a predetermined magnitude, and means responsive to a current of a greater predetermined magnitude to engage said latch means to prevent it from releasing said movable contact.

19. In a circuit interrupting device, a movable contact, a contact engageable thereby, a bimetal latch maintaining said contacts in engagement and operable to release said movable contact upon the passage therethrough of currents of a predetermined magnitude, a movably mounted magnetic member and an armature normally spaced therefrom, said member being positioned to be magnetized sufficiently by currents of a greater predetermined magnitude passing through the device, that it is attracted into engagement with the latch to prevent it from releasing said movable contact.

20. In a circuit interrupting device, an insulating terminal support member, means for automatically interrupting a circuit upon the passage therethrough of currents of a predetermined value supported at one end on said member in engagement with said terminal, another insulating terminal support member for supporting the other end of said means, a second circuit interrupting means for interrupting currents of a lesser value carried at least in part by said other support member and being in series with said first means and terminals and current responsive latch means for said second interrupting means also supported on said other support.

21. In a circuit interrupting device, an insulating terminal support member, means for automatically interrupting a circuit upon the passage therethrough of currents above a predetermined value and supported at one end on said member in engagement with said terminal, arc-extinguishing means carried by said interrupting means, another insulating terminal support member for supporting the other end of said interrupting means, a second circuit interrupting means including arc-extinguishing means on said other support member in series with said first interrupting means, and being capable of opening the circuit and extinguishing the arcs of currents only below said predetermined value.

22. In a circuit interrupting device, means of insulating material for supporting and mounting as a unit all parts of the interrupting device including a pair of circuit interrupting means electrically connected in series, one of said circuit interrupting means having arc-extinguishing means capable of interrupting heavy current arcs and the other of said circuit opening means being capable of interrupting only lighter currents, said circuit interrupting means for lighter currents being operable to interrupt the current upon the occurrence of a light overload without a current interrupting operation of said circuit interrupting means for heavy currents and means positively preventing an interrupting operation of said interrupting means for lighter currents in response to passage through said device of said heavy currents.

23. In a circuit interrupting device, means of insulating material for supporting and mounting as a unit all parts of the interrupting device including a pair of circuit opening means electrically connected in series, one of said circuit opening means having arc-extinguishing means capable of interrupting heavy current arcs and the other of said circuit opening means being capable of interrupting only lighter currents, and means responsive to the occurrence of a heavy current for preventing a circuit interrupting operation of said circuit interrupting means for lighter currents.

24. In a circuit interrupting device, means of insulating material for supporting and mounting as a unit all parts of the interrupting device including a pair of circuit opening means electrically connected in series, one of said circuit opening means having arc-extinguishing means capable of interrupting heavy current arcs and the other of said circuit opening means being capable of interrupting only lighter currents, and said circuit opening means for lighter currents being operable to interrupt the current upon the occurrence of a light overload without a current interrupting operation of said circuit interrupting means for heavy currents, means responsive to said heavy currents for positively preventing an interrupting operation of said circuit interrupting means for lighter currents but permitting operation thereof to open the circuit after each interruption of the current by said circuit interrupting means for heavy currents.

25. In a dropout fuse, fusible means having a terminal adapted to be releasably maintained in engagement with a cooperating contact, and means independent of said fusible means for automatically releasing said terminal to permit movement thereof away from said contact, said release means operable upon a circuit interrupting operation by said fusible means solely in response to extinguishing of the arc and interruption of the circuit.

26. In a dropout fuse, fusible means having a terminal adapted to be releasably maintained in engagement with a cooperating contact, and means for automatically releasing said terminal to permit movement thereof away from said contact, and said release means operable upon a circuit interrupting operation by said fusible means solely in response to extinguishing of the arc and interruption of the circuit.

27. In a dropout fuse, fusible means having a terminal adapted to be releasably maintained in engagement with a cooperating contact, means for automatically releasing said terminal in response to blowing of said fusible means to permit movement thereof away from said contact, and means responsive to blowing of said fusible means for restraining operation of said releasing means until the circuit is completely interrupted by said fusible means.

28. In a circuit interrupter, a plurality of circuit interrupting means connected in series, one of said means adapted to interrupt high currents and another adapted to interrupt low currents, and means operable in response to said high currents for positively preventing operation of said interrupting means adapted to interrupt low currents.

29. In a circuit interrupter, a plurality of circuit interrupting means connected in series, one of said means adapted to interrupt high currents and another adapted to interrupt low currents, at least one of said interrupting means being normally operable to automatically interrupt the circuit in response to the passage therethrough of currents above a predetermined value, and means operable in response to said high currents for positively preventing operation of said interrupting means adapted to interrupt low currents.

30. In a circuit interrupter, a plurality of circuit interrupting means connected in series, one of said means adapted to interrupt high currents and another adapted to interrupt low currents, both of said interrupting means being normally operable to automatically interrupt the circuit in response to the passage therethrough of currents above different predetermined values, respectively, and means operable in response to said high currents for positively preventing operation of said interrupting means adapted to interrupt low currents.

31. In a circuit interrupter, blade means mounted for movement into and out of engagement with a cooperating contact, circuit interrupting means carried by said blade means, and current responsive locking means for maintaining said contacts in engagement in response to currents above a predetermined value.

32. In a circuit interrupting device, a movable contact, a contact engageable thereby, current responsive latch means maintaining said contacts in engagement and operable to release said movable contact upon passage therethrough of currents of a predetermined magnitude, further current responsive means preventing release of said latch means upon the passage through the device of currents of a greater predetermined magnitude, and arc extinguishing means capable of extinguishing arcs having currents below said greater predetermined magnitude for extinguishing arcs drawn between said contacts.

33. In a circuit interrupter, blade means mounted for movement into and out of engagement with a cooperating contact, circuit interrupting means carried by said blade means, means engageable with said blade means for positively preventing relative separating movement of said blade means and contact upon an interrupting operation of said interrupting means and thereafter permitting such separating movement.

34. In a circuit interrupter, blade means mounted for movement into and out of engagement with a cooperating contact, circuit interrupting means carried by said blade means, and means associated therewith for positively insuring sequential interrupting operations of said interrupting means and said contact and blade means, respectively.

35. Circuit interrupting means including a support having a disconnect contact, a cooperating contact, said support being mounted for movement to engage and disengage said contacts, circuit interrupting means carried by said movable support connected in series with said contacts, and means operable in response to a circuit interrupting operation of said interrupting means to prevent separation of said contacts until the circuit has been interrupted by said interrupting means.

36. In a circuit interrupter, blade means mounted for movement into and out of engagement with a cooperating contact, circuit interrupting means carried by said blade means, means associated with said contact for positively preventing relative separating movement of said blade means upon an interrupting operation of said interrupting means and thereafter permitting such separating movement.

37. In a circuit interrupting device, a fuse mounted for movement of one terminal thereof into and out of engagement with a line contact, and means forming a restricted arc passage positioned only in the path of movement of said one terminal of said fuse for extinguishing an arc drawn between said terminal and contact whereby at least load currents below the instantaneous rating of said fuse may be interrupted by movement of said fuse terminal out of engagement with said contact.

38. In a circuit interrupting device, a fuse mounted for movement of one terminal thereof into and out of engagement with a line contact, means for extinguishing an arc forming a restricted arc passage for an arc drawn between said terminal and contact whereby at least load currents below the instantaneous rating of said fuse may be interrupted by movement of said fuse terminal out of engagement with said contact, latch means for maintaining said fuse terminal in engagement with said contact, and said latch means being operable in response to overload currents at values below those at which said fuse will blow, to release said terminal from said contact.

39. In a circuit interrupting device, a fuse mounted for movement of one terminal thereof into and out of engagement with a line contact, means for extinguishing an arc drawn between said terminal and contact whereby at least load currents below the instantaneous rating of said fuse may be interrupted by movement of said fuse terminal out of engagement with said contact, latch means for maintaining said fuse terminal in engagement with said contact, said latch means being operable in response to overload currents at values below those at which said fuse will blow to release said terminal from said contact, and means for manually releasing said latch means.

40. In a circuit interrupter, a line contact, an elongated fuse having a terminal adjacent one end thereof, said fuse mounted adjacent the other end thereof for substantially pivotal movement of said fuse terminal into and out of engagement with said contact, and means forming a restricted arc passage positioned only in the portion of the path of movement of said terminal adjacent said contact, whereby currents below the instantaneous rating of said fuse may be interrupted by movement of said fuse terminal out of engagement with said contact.

41. In a circuit interrupter, a line contact, an elongated fuse having a terminal adjacent one end thereof, said fuse mounted adjacent the other end thereof for substantially pivotal movement of said fuse terminal into and out of engagement with said contact, latch means for retaining said terminal in engagement with said contact, and means forming a restricted arc passage positioned only in the portion of the path of movement of said terminal adjacent said contact, whereby currents below the instantaneous rating of said fuse may be interrupted by movement of said fuse terminal out of engagement with said contact, after release of said latch means.

ROBERT C. DICKINSON.